United States Patent
DeKoning et al.

(10) Patent No.: US 6,381,674 B2
(45) Date of Patent: *Apr. 30, 2002

(54) METHOD AND APPARATUS FOR PROVIDING CENTRALIZED INTELLIGENT CACHE BETWEEN MULTIPLE DATA CONTROLLING ELEMENTS

(75) Inventors: Rodney A. DeKoning; Bret S. Weber, both of Wichita, KS (US)

(73) Assignee: LSI Logic Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,770

(22) Filed: Sep. 30, 1997

(51) Int. Cl.$^7$ .............................................. G06F 12/00
(52) U.S. Cl. ...................... 711/113; 711/114; 711/130; 711/118
(58) Field of Search .................................. 711/113, 114, 711/4, 173, 147, 141, 144, 148, 130, 122, 119, 112, 202, 142, 143, 134, 133, 118

(56) References Cited

U.S. PATENT DOCUMENTS

| | | | | |
|---|---|---|---|---|
| 5,163,131 A | | 11/1992 | Row et al. ................... | 395/200 |
| 5,249,279 A | | 9/1993 | Schmenk et al. ............ | 395/425 |
| 5,257,367 A | * | 10/1993 | Goodlander et al. ........ | 395/600 |
| 5,274,799 A | * | 12/1993 | Brant et al. .................. | 395/575 |
| 5,297,258 A | | 3/1994 | Hale et al. ................... | 395/275 |
| 5,339,408 A | | 8/1994 | Bruckert et al. ............. | 395/575 |

(List continued on next page.)

FOREIGN PATENT DOCUMENTS

WO  9201988  2/1992  ........... G06F/13/36

OTHER PUBLICATIONS

O'Brien J; RAID 7 Architcture Features Asynchronous Data Transfers; Computer Technology Review; vol. 12, No. 6, May 1, 1992; pp. 43–47.

Jai Menon et al; The Architecture of a Fault–Tolerant Cached RAID Controller; Computer Architcture News; vol. 21, No. 2, May 1, 1993; pp. 76–86.

*Primary Examiner*—Don Hyun Yoo
*Assistant Examiner*—Kimberly McLean

(57) ABSTRACT

Apparatus and methods which allow multiple storage controllers sharing access to common data storage devices in a data storage subsystem to access a centralized intelligent cache. The intelligent central cache provides substantial processing for storage management functions. In particular, the central cache of the present invention performs RAID management functions on behalf of the plurality of storage controllers including, for example, redundancy information (parity) generation and checking as well as RAID geometry (striping) management. The plurality of storage controllers (also referred to herein as RAID controllers) transmit cache requests to the central cache controller. The central cache controller performs all operations related to storing supplied data in cache memory as well as posting such cached data to the storage array as required. The storage controllers are significantly simplified because the present invention obviates the need for duplicative local cache memory on each of the plurality of storage controllers. The storage subsystem of the present invention obviates the need for inter-controller communication for purposes of synchronizing local cache contents of the storage controllers. The storage subsystem of the present invention offers improved scalability in that the storage controllers are simplified as compared to those of prior designs. Addition of storage controllers to enhance subsystem performance is less costly than prior designs. The central cache controller may include a mirrored cache controller to enhance redundancy of the central cache controller. Communication between the cache controller and its mirror are performed over a dedicated communication link.

28 Claims, 10 Drawing Sheets

U.S. PATENT DOCUMENTS

| | | | | |
|---|---|---|---|---|
| 5,423,046 A | | 6/1995 | Nunnelley et al. | 395/750 |
| 5,488,731 A | * | 1/1996 | Mendelsohn | 395/800 |
| 5,493,668 A | * | 2/1996 | Elko et al. | 395/457 |
| 5,499,341 A | | 3/1996 | Wilson et al. | 395/200.03 |
| 5,504,882 A | | 4/1996 | Chai et al. | 395/182.03 |
| 5,548,711 A | * | 8/1996 | Brant et al. | 395/182.03 |
| 5,588,110 A | * | 12/1996 | DeKoning et al. | 395/182.03 |
| 5,640,506 A | * | 6/1997 | Duffy | 395/182.04 |
| 5,761,705 A | * | 6/1998 | DeKoning et al. | 711/113 |
| 5,778,430 A | * | 7/1998 | Ish et al. | 711/133 |
| 5,812,754 A | * | 9/1998 | Lui et al. | 395/182.04 |
| 5,819,054 A | | 10/1998 | Ninomiya et al. | 395/308 |
| 5,819,310 A | * | 10/1998 | Vishlitzky et al. | 711/114 |
| 5,826,001 A | * | 10/1998 | Lubbers et al. | 395/182.04 |
| 5,884,098 A | * | 3/1999 | Mason, Jr. | 395/872 |
| 5,892,913 A | * | 4/1999 | Adiga et al. | 395/200.49 |
| 5,905,854 A | * | 5/1999 | Nielson et al. | 395/182.04 |
| 5,917,723 A | * | 6/1999 | Binford | 364/131 |
| 6,009,481 A | * | 12/1999 | Mayer | 711/113 |
| 6,014,756 A | * | 1/2000 | Dottling et al. | 714/15 |
| 6,041,394 A | * | 3/2000 | Halligan et al. | 711/166 |
| 6,055,603 A | * | 4/2000 | Ofer et al. | 711/113 |
| 6,098,149 A | * | 8/2000 | Ofer et al. | 711/112 |
| 6,101,589 A | * | 8/2000 | Fuhrmann et al. | 711/169 |

* cited by examiner

METHOD AND APPARATUS FOR PROVIDING CENTRALIZED INTELLIGENT CACHE BETWEEN MULTIPLE DATA CONTROLLING ELEMENTS

RELATED PATENTS

This patent is related to commonly assigned, co-pending, U.S. patent application Ser. No. 08/772,614 entitled METHODS AND APPARATUS FOR COORDINATING SHARED MULTIPLE RAID CONTROLLER ACCESS TO COMMON STORAGE DEVICES filed Dec. 23, 1996 which is hereby incorporated by reference.

BACKGROUND OF THE INVENTION

1. Field of the Invention

This invention relates generally to caching within a data storage subsystem and in particular to controller element(s) used as intelligent central cache apparatus within multiple redundant controller data storage subsystems.

2. Discussion of Related Art

Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

A popular solution to these mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly referred to by the acronym RAID). The 1987 publication by David A. Patterson, et al., from University of California at Berkeley entitled *A Case for Redundant Arrays of Inexpensive Disks (RAID)*, reviews the fundamental concepts of RAID technology.

RAID storage subsystems typically utilize a control module that shields the user or host system from the details of managing the redundant array. The controller makes the subsystem appear to the host computer as a single, highly reliable, high capacity disk drive. In fact, the RAID controller may distribute the host computer system supplied data across a plurality of the small independent drives with redundancy and error checking information so as to improve subsystem reliability.

In some RAID configurations a portion of data is distributed across a plurality of data disk drives and associated redundancy information is added on an additional drive (often referred to as a parity drive when XOR parity is used for the redundancy information). In such configurations, the related data so distributed across plurality of drives is often referred to as a stripe. In most RAID architectures, the "write" operation involves both a write of the data to the data disk and also an adjustment of parity information. The parity information adjustment may involve the reading of other data in the same stripe and writing of the newly computed parity for the blocks of the stripe. This imposes a large "write penalty" upon RAID systems (RAID levels 3–6), often making them slower than traditional disk systems in the typical write I/O operation.

Known RAID subsystems provide cache memory structures to further improve the performance of the RAID subsystem write operations. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

It is taught in co-pending U.S. patent application Ser. No. 08/772,614 to provide redundant control modules sharing access to common storage modules to improve subsystem performance while reducing the failure rate of the subsystem due to control electronics failures. In such redundant architectures as taught by co-pending U.S. patent application Ser. No. 08/772,614, a plurality of control modules are configured such that they control the same physical array of disk drives. As taught by prior designs, a cache memory module is associated with each of the redundant control modules. Each controller will use its cache during control of the data storage volume which it accesses.

In this configuration, the controllers gain the advantage of being able to simultaneously handle multiple read and write requests directed to the same volume of data storage. However, since the control modules may access the same data, the control modules must communicate with one another to assure that the cache modules are synchronized. Other communications among the cooperating controllers are used to coordinate concurrent access to the common resources. Semaphore locking and related multi-tasking techniques are often utilized for this purpose. The control modules therefore communicate among themselves to maintain synchronization of their respective, independent cache memories. Since many cache operations require the controllers to generate these synchronization signals and messages or semaphore locking and releasing messages, the amount of traffic (also referred to as coordination traffic or cache coordination traffic) generated can be substantial. This coordination traffic imposes a continuing penalty upon the operation of the data storage subsystem by utilizing valuable bandwidth on the interconnection bus as well as processing overhead within the multiple control modules. If not for this overhead imposed by coordination traffic, the data storage subsystem would have more bandwidth and processing power available for I/O processing and would thus operate faster.

In such a configuration wherein each control module has its own independent cache memory (also referred to herein as decentralized cache), there is significant duplication of the circuits and memory that comprise the cache memory on each control module. This duplication increases the complexity (and therefore the cost of manufacture) of the individual control modules. A decentralized cache architecture subsystem is scaled up by addition of control modules, each with its own duplicated cache memory circuits. This added complexity (and associated costs) therefore makes simple scaling of performance problematic.

In view of the above it is clear that a need exists for an improved cache architecture for redundant control module data storage subsystems which improves data storage subsystem performance and scalability while reducing duplication and complexity of known designs.

SUMMARY OF THE INVENTION

The present invention solves the above and other problems, and thereby advances the useful arts, by providing an intelligent central cache shared among a plurality of storage controllers in a storage subsystem. An intelligent central cache is a cache cooperatively engaged with the control modules (storage controllers) to provide caching within the storage subsystem. Various functions are performed within the intelligent central cache including storage, generation, and maintenance of cache meta-data, stripe lock functions to enable coordinated sharing of the central cache features, and functions to coordinate cache flush operations among the plurality of attached control modules.

By contrast, a "dumb" (unintelligent) cache, though it may be a centralized resource, is one used merely as a memory bank, typically for myriad purposes within the data storage subsystem. The intelligent cache of the present invention shares with the attached controllers much of the control logic and processing for determining, for example, when, whether, and how to cache data and meta-data in the cache memory. Cache meta-data includes information regarding the type of data stored in the cache including indications that corresponding data is clean or dirty, current or old data, and redundancy (e.g., RAID parity) data or user related data. The intelligent central cache of the present invention generates, stores, and utilizes cache meta-data for making such determinations relating to the operation of the central cache independently of and/or cooperatively with the storage controllers of the subsystem. Furthermore, the intelligent central cache of the present invention coordinates the management of non-volatility in the cache memory by coordinating with the control modules the monitoring of battery backup status, etc.

The features of the central cache are made accessed by the plurality of controllers through an application program interface (API) via inter-process communication techniques. In particular, the control modules may request, via an API function, that information be inserted or deleted from the cache. Attributes are provided by the requesting controller to identify the type of data to be inserted (e.g., clean or dirty, new or old, user data or parity, etc.). Other API functions are used to request that the central controller read or return identified data to a requesting controller. Attribute data may also be so retrieved. API functions of the intelligent central cache also assist the controllers in performing cache flush operations (such as required in write-back cache management operations). An API function requests of the central cache a map identifying the status of data blocks in particular identified stripes. The requesting control module may then use this map information to determine which data blocks in the identified stripes are to be flushed to disk. Other API functions allow the central cache to perform cache flush operations independent of requests from the attached control modules. Still other API functions provide the low level stripe lock (semaphore management) functions required to coordinate the shared access by control modules to the central cache. Details of exemplary API operations are discussed below.

The preferred embodiment of the present invention includes a plurality of control modules interconnected by redundant serial communication media such as redundant Fibre Channel Arbitrated Loops ("FC-AL"). The disk array control modules share access to an intelligent central cache memory (also referred to herein as a caching controller or cache control module). The caching controller is cooperatively engaged with the control modules in the data storage subsystem (also referred to herein as controllers or as host adapters to indicate their primary function within the storage subsystem) to provide intelligent management of the cache. The controllers access the caching controller to perform required caching operations relating to an I/O request processed within the controller.

This centralized cache architecture obviates the need to exchange substantial volumes of information between control modules to maintain consistency between their individual caches and to coordinate their shared access to common storage elements, as is taught by co-pending U.S. patent application Ser. No. 08/772,614. Eliminating coordination traffic within the storage subsystem frees the processing power of the several controllers for use in processing of I/O requests. Further, the reduced bandwidth utilization of the interconnecting bus (e.g., FC-AL) allows the previously consumed bandwidth to be used for data storage purposes other than mere overhead communication.

The I/O request processing power in a storage subsystem in accordance with the present invention is easily scaled as compared to known systems. In the preferred ordinary control module (host adapter) in the subsystem. The caching controller is simply populated with significant cache memory as compared to the other controllers (host adapters) which are substantially depopulated of cache memory. One skilled in the art will recognize that a limited amount of memory on each host adapter may be used for staging or buffering in communication with the central cache. Or for example, a multi-tiered cache structure may utilize a small cache on each controller but the large cache is centralized in accordance with the present invention. The controllers of the present invention are therefore simplified as compared to those of prior decentralized cache designs wherein each controller has local cache memory. Additional controllers may be added to the subsystem of the present invention to thereby increase I/O processing capability without the added complexity (cost) of duplicative cache memory.

In addition, the central cache controller of the present invention, perse, may be easily scaled to meet the needs of a particular application. First, an additional cache controller is added in the preferred embodiment to provide redundancy for the centralized cache of the subsystem. The redundant cache controllers communicate via a separate communication link (e.g., an FC-AL link) to maintain mirrored cache synchronization. Secondly, additional cache controllers may be added to the subsystem of the present invention for purposes of enlarging the central cache capacity. The additional cache controllers cooperate and communicate via the separate communication link isolated to the cache controllers. A first cache controller may perform cache operations for a first segment of the cache (mapped to a particular portion of the disk array) while other cache controllers process other segments of the cache (mapped to other portions of the disk array). Mirrored cache controllers may be added to the subsystem associated with each of the segment cache controllers.

It is therefore an object of the present invention to improve data storage subsystem performance in a data storage subsystem having a plurality of controllers.

It is another object of the present invention to improve data storage subsystem performance by providing an intelligent central cache within the data storage subsystem.

It is still another object of the present invention to improve performance in a data storage subsystem having a plurality of storage controllers by providing an intelligent central cache accessible to the plurality of storage controllers.

It is a further object of the present invention to reduce the complexity of storage controllers in a data storage subsystem having a plurality of such storage controllers by providing an intelligent central cache shared by all such storage controllers.

It is yet a further object of the present invention to improve the scalability of a data storage subsystem having a plurality of storage controllers by obviating the need for local cache memory on each such storage controller and providing an intelligent central cache shared by all such storage controllers in the subsystem.

The above and other objects, aspects, features and advantages of the present invention will become apparent from the following detailed description and the attached drawings.

DETAILED DESCRIPTION OF THE PREFERRED EMBODIMENTS

Figure 1A:
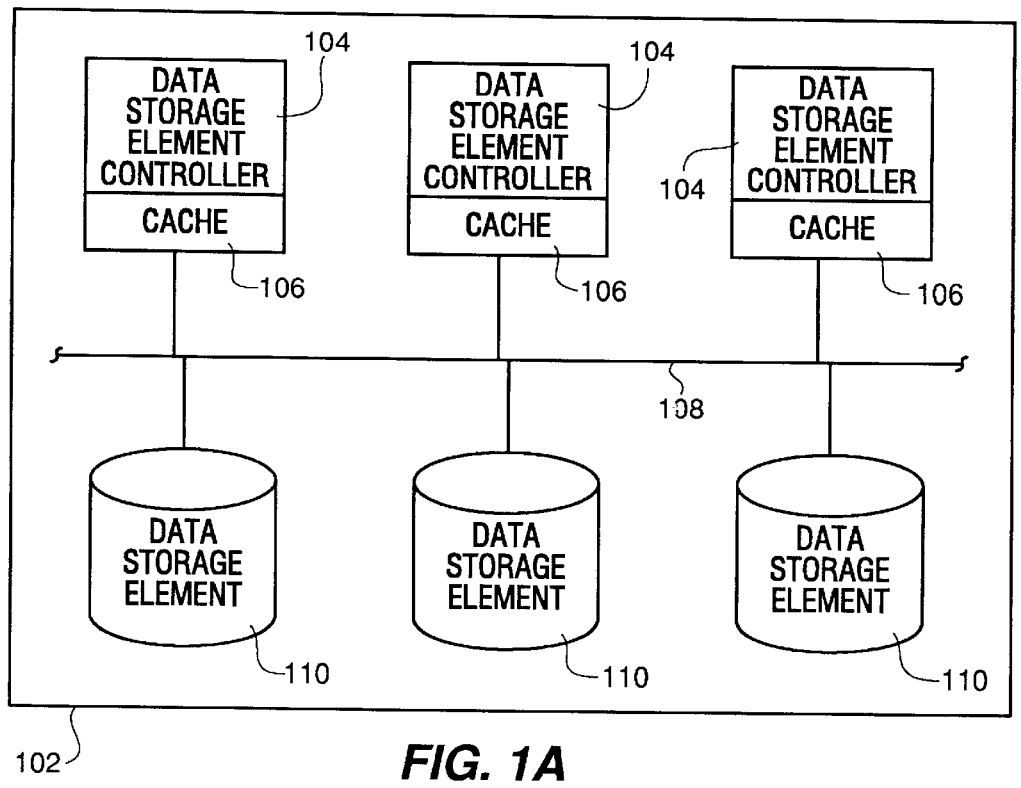
FIG. 1A is a block diagram of a prior art data storage subsystem.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

PRIOR ART STORAGE SUBSYSTEMS

FIG. 1A is a block diagram of data storage subsystem 102 as known in the prior art having a decentralized cache architecture. The system has a plurality of storage controllers 104 (also referred to as control modules). Each control module 104 has its own local cache memory 106. Controllers 104 are connected via communication medium 108 to data storage elements 110. In normal operation, controllers 104 receive I/O requests and process the requests reading or writing as appropriate from or to data storage elements 110. Each controller 104 utilizes its local cache memory 106 to speed response of common I/O requests.

In most known storage subsystems having a plurality of control modules, each control module accesses a distinct portion of the storage elements. The control modules do not share simultaneous access to any portion of the storage elements. In such known systems, the control modules are operable independent of one another. For example, in most RAID storage subsystems, each control module of such a plurality of controllers is responsible for one or more logical units (LUNs) of the storage array. No other controller has the ability to simultaneously access those LUNs. Though a redundant or mirrored controller may be present, it is not simultaneously operable to access the LUNs managed by the first control module.

In other storage subsystems as taught in co-pending U.S. patent application Ser. No. 08/772,614, the plurality of control modules may simultaneously access common portions of the storage elements to thereby enhance the subsystem performance. In such systems, the plurality of controllers exchange messages amongst themselves to coordinate the shared access to the storage elements. For example, in some RAID subsystems, a plurality of RAID controllers in the subsystem may simultaneously access common LUNs. Each controller may be operating on a separate I/O request associated with the shared LUN. As noted in such systems, the controllers exchange messages with one another to coordinate the shared access to the common storage elements. Among the messages are cache synchronization messages required to assure that all controllers which share access to a common portion of the storage elements are aware of the cache contents of other controllers which manipulate the shared storage elements. For example, if one controller completes an I/O operation which results in updates to its local cache memory, it must inform all other controllers of the cache update so that all caches maintain synchronization with respect to cached data not yet flushed to disk. Similarly, when one of the control modules sharing access to a common portion of the storage elements determines that the cached data need be flushed to the storage elements, it must notify other controllers associated with the shared storage elements to assure that all are aware of the updated state of the storage elements. This coordination message exchange (coordination traffic) imposes significant overhead processing on the control modules (host adapters) and consumes valuable bandwidth on the communication medium interconnecting the subsystem components and thus impairs system performance.

For example, in FIG. 1A, significant coordination traffic in communication medium 108 between control modules 104 to maintain synchronization of cache memories 106 consumes available bandwidth on communication medium 108 reducing available bandwidth for operations between the control modules 104 and the storage elements 110.

Figure 1B:
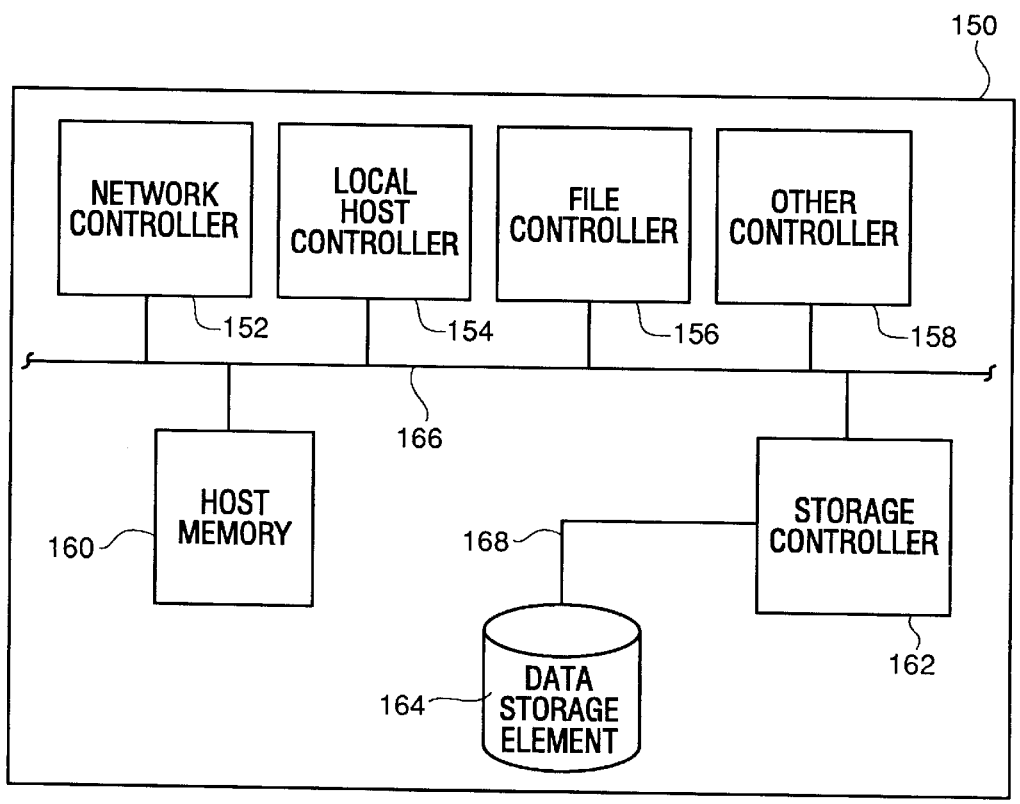
FIG. 1B is a block diagram of a prior art data storage subsystem having only generalized system memory and non-centralized data storage controller memory.

FIG. 1B is a block diagram of another prior art data storage subsystem 150 exemplifying the use of a "dumb" central cache by a plurality of controllers. This configuration may represent, for example, a device commonly referred to as a network file server. A network file server is often a general purpose computer system with special software dedicated to the provision of file system services to an attached network of host systems (clients). Such a system has a variety of processors operating on bus 166 and using the same memory, general host memory 160 (dumb central cache). For example, in FIG. 1B, network controller 152, local host controller 154, file controller 156, storage controller 162, and potentially other controllers 158 all share access host memory 160 via bus 166. Each controller performs a unique function within the subsystem 150. For example, network controller 152 manages network connections between the storage subsystem and external host systems, file controller 156 manages file system operations within the subsystem 150 to perform file operations requested by external host systems, and storage controller 162 translates I/O requests generated by, for example, file controller 156 into appropriate lower level signals appropriate to the data storage element 164 and its connection bus 168 (e.g., SCSI, IDE, EIDE, etc.). Local host controller 154 guides and coordinates the overall operation of the controllers of subsystem 150.

All the controllers share access to the host memory 160 via bus 166. The uses of host memory 160 may vary widely. Network controller 152 may use the storage space for network protocol management while file controller 156 may use the storage space for file system management functions. All processors and controllers may use the host memory 160 for initial loading of their operation programs if not also for runtime fetch and execution of those programs. In other words, host memory 160 is exemplary of a dumb memory bank used for myriad purposes within the storage subsystem 150 (e.g., a RAMdisk or solid state disk as known in the art). It is not dedicated to the cache storage of data and meta-data relating to I/O requests from attached host systems.

Typical systems with an architecture as depicted in FIG. 1B add local cache memory to controllers in the subsystem which require specialized, dedicated caching operations. For example, file controller 156, network controller 152, and storage controller 162 may each have local cache memory used for their specific functions. The central cache (host memory 160) provides no specialized functionality for any of the myriad controllers sharing access to it. Rather, it is no more than a "dumb" memory bank in which various controllers may store information for any purpose.

Figure 3:
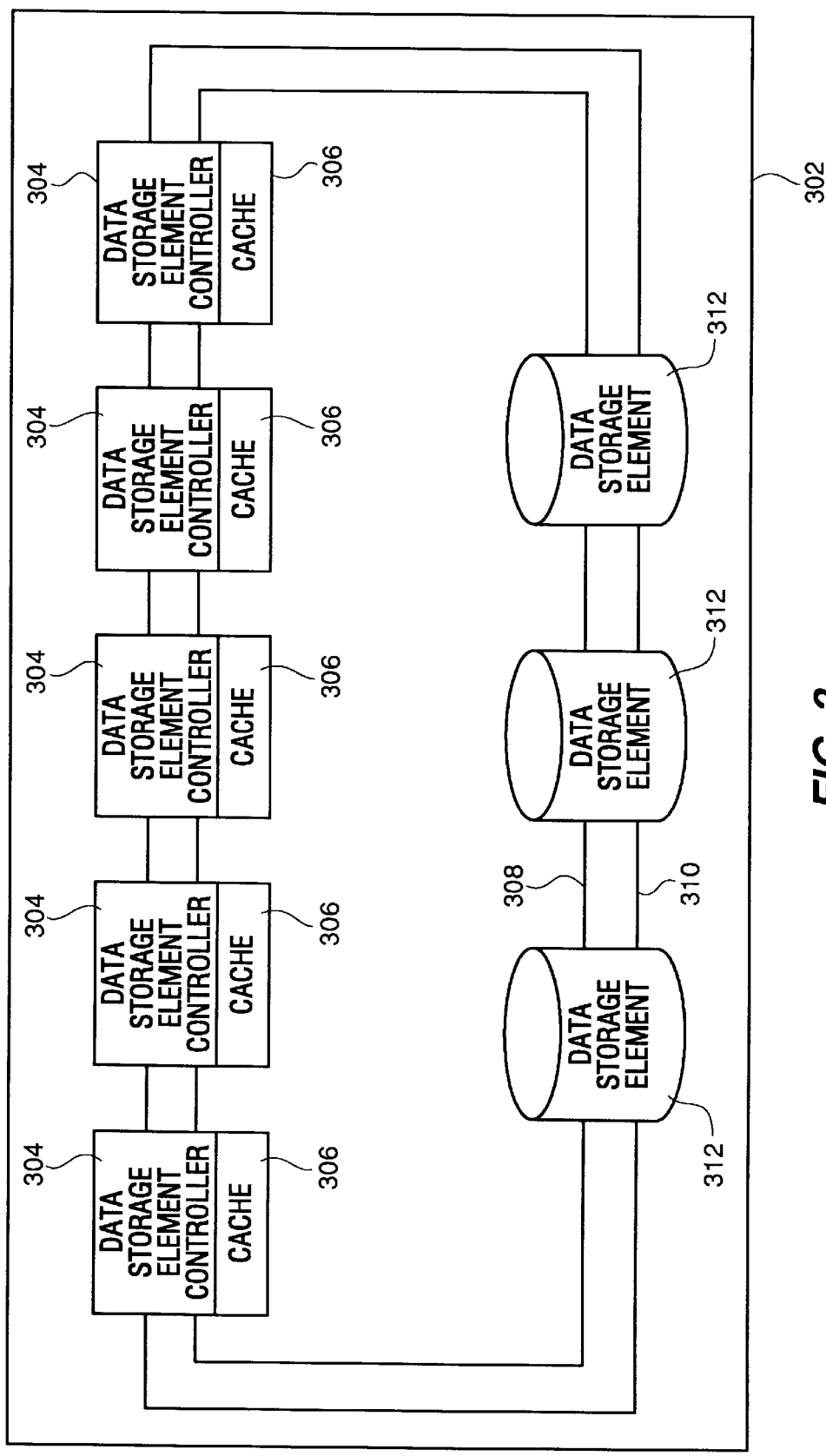
FIG. 3 is a block diagram of a prior art Fibre Channel Loop Architecture data storage subsystem having redundant controllers.

FIG. 3 is a block diagram exemplifying another storage subsystem architecture known in the art. In data storage subsystem 302 each storage control module 304 includes a local cache memory 306 used exclusively by its corresponding control module 304. Controllers 304 are connected via redundant FC-AL loops 308 and 310 to data storage elements 312.

In this prior art system, data storage elements 312 are disk arrays. Control modules 304 are disk array control modules having RAID management capabilities. Each control module 304 maintains a decentralized cache 306 to aid it in rapid performance of I/O operations. In order to maintain cache synchronization, disk array control modules 304 must continuously signal back and forth to each other. In addition, each disk array control module 304 must carry out all RAID operations individually: configuration of LUNs, calculation of parity data, RAID management of failed devices, etc. As noted above with respect to FIG. 1A, coordination traffic on FC-AL loops 308 and 310 uses valuable processing power of the controllers 304 as well as communication bandwidth which could otherwise be used for performing I/O requests initiated by attached host systems.

All prior storage subsystems exemplified by FIGS. 1A, 1B and 3 share certain common problems. As noted above, when a plurality of controllers within such subsystems share access to common storage elements, a large volume of cache coordination message traffic is generated on the interconnection medium thereby reducing available processing power and communication bandwidth for processing of I/O requests between the controllers and the storage elements. In addition, the prior storage subsystems are not easily scaled up for performance enhancement. Since each controller may include a local cache for boosting its individual performance, the incremental cost of adding another controller is increased. Each controller has the added complexity of potentially large cache memory devices and associated glue and custom assist logic circuits (such as RAID parity assist circuits).

STORAGE SUBSYSTEMS OF THE PRESENT INVENTION

By contrast with prior designs, storage subsystems of the present invention include an intelligent centralized cache (also referred to as a cache controller) which is shared by all controllers in the storage subsystem. Since the cache controller of the present invention is a centralized resource, each controller sharing its function may be simplified by eliminating its local cache memory. Such a simplified controller reduces the incremental cost associated with adding a controller to the subsystem to enhance overall performance.

More importantly, the central cache of the present invention is intelligent in that it includes circuits dedicated to enhancing its specific purpose of caching data destined for storage elements. For example, in a RAID subsystem, the intelligent central cache of the present invention preferably includes parity assist (generation and checking) circuits to aid in rapidly performing required parity operations. Centralizing such intelligent assist circuits further reduces the cost and complexity of the RAID controllers in the storage subsystem.

In addition, the centralized cache of the present invention obviates the need found in the prior art for extensive cache coordination message traffic (such as cache and stripe lock message traffic). The central cache preferably maintains control over the cache on behalf of all controllers in the subsystem. When, as in the preferred embodiment of the present invention, a redundant (mirrored) or additional cache controller is added to the subsystem, a dedicated communication path is available for the exclusive purpose of inter-cache controller synchronization communication. No bandwidth on the common controller communication medium is required to assure mirrored cache synchronization. A simpler (e.g., lower cost) embodiment may utilize the existing communication paths to avoid the cost of an additional dedicated communication path. Such an embodiment would sacrifice some performance enhancements of the present invention but at a cost and complexity savings.

Furthermore, the intelligent central cache of the present invention provides semaphore services for resource locking (stripe locking) to coordinate common access to the disk array by the plurality of control modules. No one of the controllers, as taught in co-pending U.S. patent application Ser. No. 08/772,614, need be designated as a primary controller with respect to a particular shared LUN. Rather, in accordance with the present invention, the intelligent central cache provides such multiple access coordination through semaphore stripe lock features.

The intelligent cache controller of the present invention also provides cache mirroring features when additional cache controllers are added to the subsystem. As discussed below, multiple cache controllers coordinate their intelligent cache management functions in accordance with the present invention through a separate communication channel. The primary communication channel interconnecting the control modules, the cache controllers, and the storage elements remains unburdened by the requisite coordination traffic for mirrored cache operation. Additional cache modules may also operate in a cooperative manner rather than a mirrored architecture wherein each controller is responsible for cache operations associated with a particular portion of the storage elements total capacity.

Figure 2:
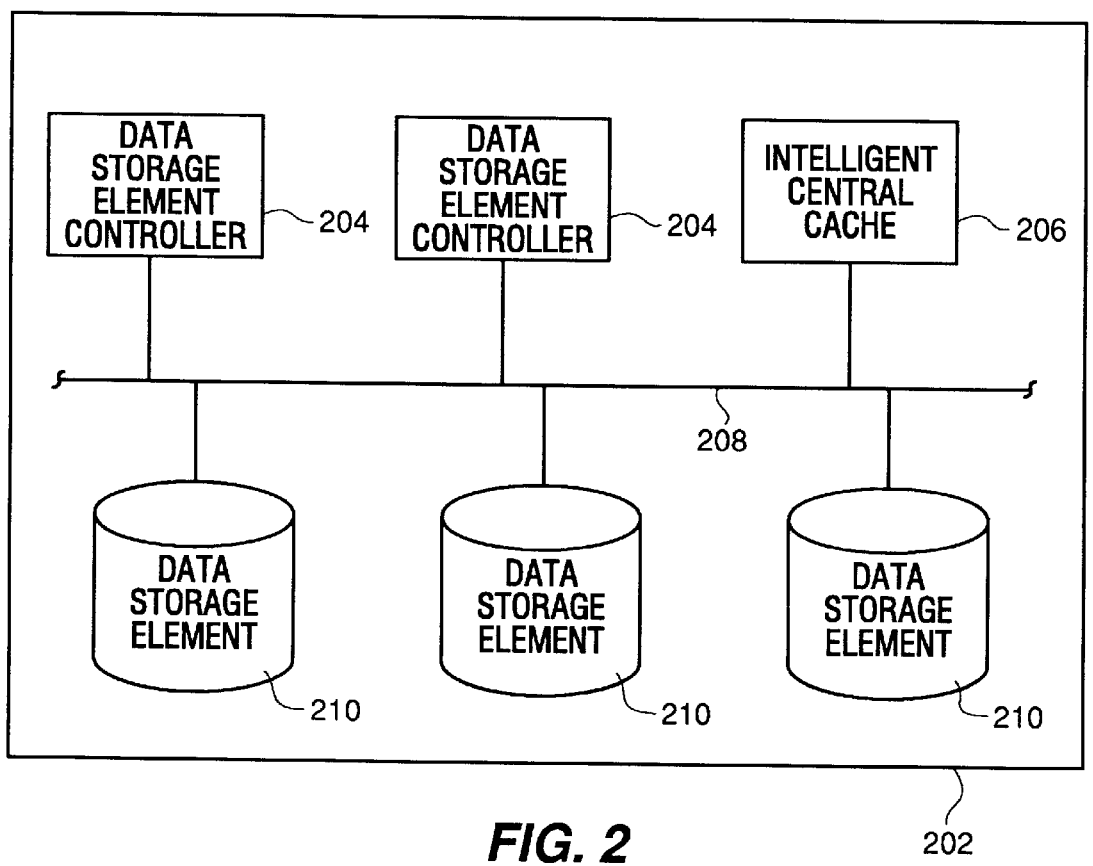
FIG. 2 is a block diagram of a first embodiment of the present invention, showing an intelligent central cache accessible by multiple controllers.

FIG. 2 is a block diagram of a first embodiment of data storage subsystem 202 operable in accordance with the methods and structures of the present invention. Controllers 204 access intelligent central cache 206 via communication medium 208.

Figure 4:
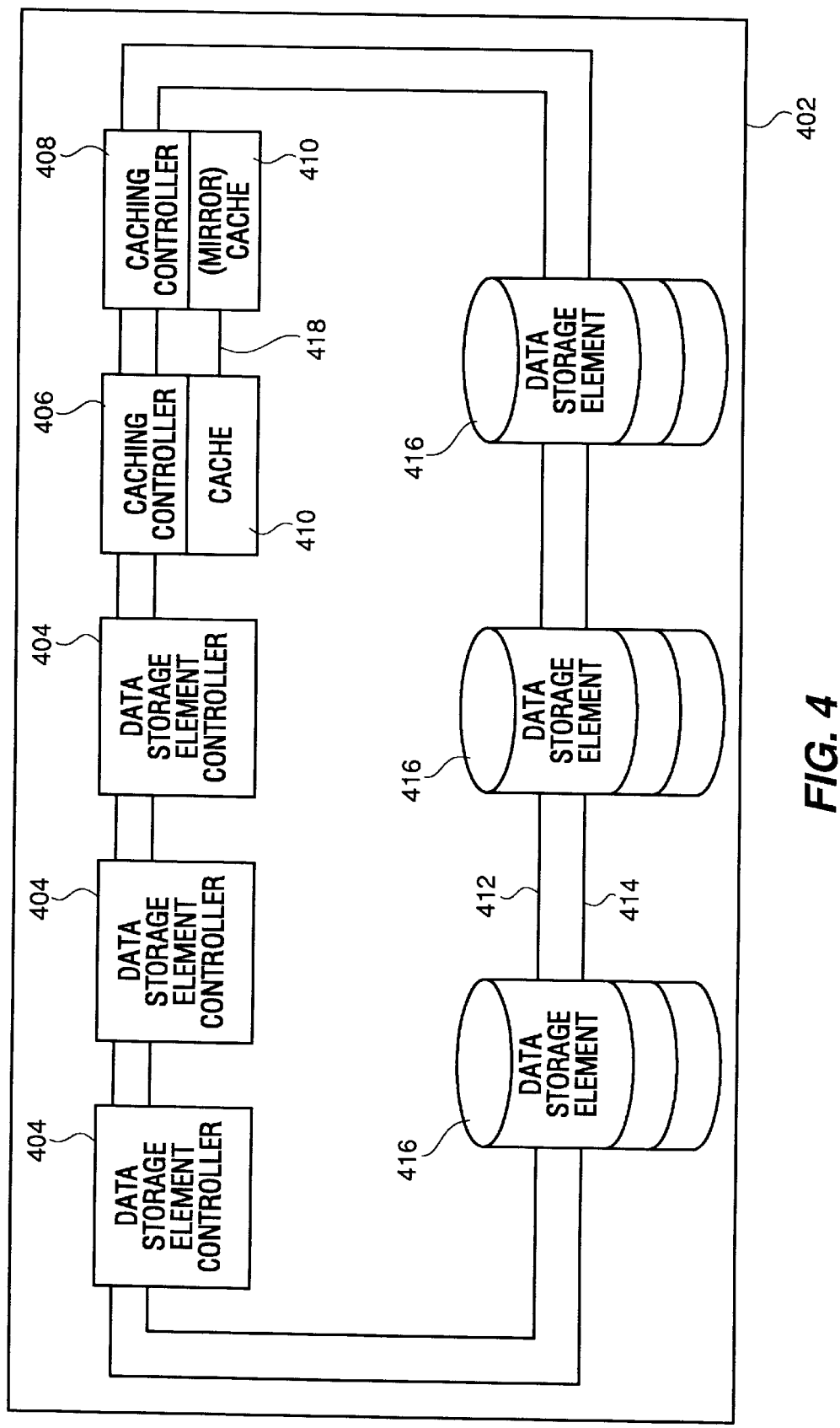
FIG. 4 is a block diagram of a preferred embodiment of the present invention, showing a plurality of controllers and caching controllers interconnected by a FC-AL with a plurality of data storage elements.

Controllers 204 and central cache 206 both access data storage elements 210 via communication medium 208. Communication medium 208 may be any of several well known buses used for interconnection of electronic devices including, for example, SCSI, IDE, EIDE, IPI. In addition, communication medium 208 may represent any of several serial communication medium such as FC-AL or SSA as depicted in FIG. 4 and as discussed below.

Intelligent central cache 206 is dedicated to data and meta-data caching in data storage subsystem 202 as distinct from controllers 204 which primarily serve to interface with attached host computer systems. The intelligent central cache 206 eliminates the need for coordination traffic among controllers having local caches thereby freeing processing power within, and communication bandwidth between, controllers 204 thereby improving overall performance of data storage subsystem 202. Intelligent central cache 206 cooperates with controllers 204 to manage the storage subsystem 202 structure and organization of information on the storage elements 210. For example, where storage subsystem 202 uses RAID storage management techniques, many RAID management functions specific to the cache are performed within intelligent central cache 206.

RAID cache management functions including parity generation and checking and logical to physical mapping of host request supplied addresses to locations on the array of disk drive storage elements 210 may be performed entirely within the intelligent central cache 206. The management of the RAID disk array geometry may therefore be off-loaded from the RAID controllers 204 to the intelligent central cache 206. Or for example, customized circuits to assist in RAID parity generation and checking can be integrated within intelligent central cache 206.

In particular, intelligent central cache 206 maintains cache data and associated cache meta-data. Generation and maintenance of cache meta-data in a decentralized cache architecture requires significant processing within, and communication among, a plurality of controllers sharing access to common storage elements. The intelligent central cache 206 of the present invention centralizes this management function to reduce processing overhead load on the controllers 204 and to reduce communication (coordination traffic) among the controllers 204.

Intelligent central cache 206 can also calculate cache statistical information. Using the cache statistical information, controllers 204 can tune their respective performance in view of statistical data corresponding to the cache usage in the overall subsystem 202.

Preferably, intelligent central cache 206 is designed as an electronic circuit board substantially identical to that of controller 204 but populated differently at time of manufacture to distinguish their respective functions. For example, controller 204 may be depopulated of any RAID parity assist circuits and depopulated of substantially all cache memory and related support circuits. Intelligent central cache 206, by contrast, is preferably populated with parity assist devices and with a large cache memory for caching of data supplied from controllers 204 and related meta-data generated by the cache management functions operable within intelligent central cache 206.

When a controller 204 prepares units of data to be cached in preparation for future posting to the storage elements 210, it simply transmits the data and a cache request over bus 208 to the intelligent central cache 206. The intelligent central cache 206 places the received data in its cache memory along with any generated meta-data used to manage the cache memory contents. The meta-data may be generated within central cache 206 such as noted above with respect to RAID parity assist or may be supplied by controller 204 as parameters when the data is supplied to central cache 206. The data supplied to central cache 206 is provided with addresses indicative of the desired disk location of the data on storage elements 210. In generating related meta-data, central cache 206 determines which other data either in its cache memory or on the storage elements 210 are required for updating associated redundancy information. The meta-data therefore indicates data that is new (currently unposted to the storage elements 210) versus old (presently posted to the storage elements 210 and also resident in central cache 206). Other meta-data distinguishes parity/redundancy information from data in central cache 206

This central cache architecture improves overall subsystem performance by obviating the need for cache coordination message traffic over bus 208 thereby reducing overhead processing within the controller 204 and eliminating cache coordination message traffic over bus 208. Controllers 204 are therefore simpler than prior controllers exemplified as discussed above. The simpler controllers are substantially void of any local cache memory and parity assist circuits. The primary function served by the simpler controller is to provide an interface to attached host systems consistent with the storage management structure (e.g., RAID) of the subsystem. This simpler design permits easier scaling of the subsystem's performance by reducing the costs (complexity) associated with adding additional controllers. In like manner, additional intelligent central cache devices may be added either to increase the cache size and/or to provide mirrored redundancy of the central cache contents. As noted below with respect to FIG. 4, when adding cache devices to the central cache, it is preferred that the plurality of central cache devices communicate among themselves over a dedicated communication medium.

FIG. 4 is a block diagram of a preferred embodiment of the present invention representing the best presently known mode of practicing the invention. FIG. 4 shows the data storage subsystem 402 having caching controller 406 dedicated to serving as an intelligent central cache memory and a second caching controller 408 dedicated to serving as a mirror of caching controller 406. Embodied in each cache controller 406 and 408 is cache memory 410. Cache controller 408 maintains in its local cache memory 410 a mirrored image of the content of cache memory 410 in cache controller 406.

Those skilled in the art will note that caching controller 408 is not limited to the role of mirroring cache controller 406 as in the preferred embodiment. Caching controller 408 may also function as an additional intelligent central cache to provide enhanced cache capacity. In such a configuration, a first cache controller (e.g., 406) provides caching services for a first range of the cache memory while a subsequent cache controller (e.g., 408) provides caching services for another portion of cache memory. For example, a first cache controller 406 (with its local cache memory 410) may provide intelligent caching services to RAID controllers 404 for a first half of the storage elements 416 while the additional cache controller 408 (with its local cache memory 410) provides caching services for the second half of the storage elements 416.

The preferred embodiment interconnects controllers 404, caching controllers 406 and 408, and data storage elements 416 via redundant FC-AL media 412 and 414. Note that caching controller 406 and caching controller 408 have an additional dedicated FC-AL loop 418 which allows communication between them. Coordination traffic between the caching controllers 406 and 408 thus does not utilize any bandwidth on FC-AL loops 412 and 414, thereby enabling the desired performance increase in data storage subsystem 402.

In the preferred embodiment, controllers 404 are substantially identical electronic assemblies to that of cache controllers 406 and 408 but have been largely depopulated of their cache memory and associated circuits. The cache memory function is provided centrally by caching controllers 406 and 408. Because the caching function is centralized, overhead processing by RAID controllers 404 and communication on FC-AL 412 and 414 relating to cache synchronization is reduced or eliminated to thereby enhance subsystem performance.

Data storage elements 416 are preferably disk arrays. Controllers 404 and the caching controllers 406 and 408 cooperate to "map" the host-supplied address to the physical address of the storage elements. The tasks involved in this "mapping" or "translation" are one important part of the RAID management of the disk array 416. Specifically, controllers 404 receive I/O requests from a host system (not shown) and translate those requests into the proper addressing format used by the caching controllers 406 and 408. The data supplied in the host requests is mapped into appropriate parameters corresponding to the API operations described below. The cache controllers 406 and 408 then perform the logical to physical mapping required to store the data in cache memory 410 and to later retrieve the data for posting to the storage element 416.

A variety of alternative modes of mapping host supplied request addresses into locations in the central cache may be recognized by those skilled in the art. Each such method may suggest a different distribution of the RAID management between the controllers 404 and the caching controllers 406 and 408. For example, the mapping process which determines how stripes are mapped across a plurality of disk drives (e.g., in RAID levels 2–5) may be distributed between the control modules and the central cache. A spectrum of possible distributions are possible. For example at one extreme, the control modules may be solely responsible for mapping host addresses to RAID level 2–5 stripe locations and geometries (i.e., the central cache provides a linear address space for the control modules to access). Or for example, at another extreme, the central cache may possess exclusive knowledge of the mapping to RAID stripe geometries and distribution of data over the disk array. The parameters supplied to the API functions of the central cache describe the addresses as known to the central cache.

Regardless of the particular addressing mode (mapping of addresses) used by cache controllers 406 and 408, they are preferably responsible for RAID management tasks such as parity generation and checking for data supplied from the RAID controllers 404. The redundancy information, and other cache meta-data, generated and stored within cache memory 410 of cache controllers 406 and 408 is used to assist RAID controllers 404 in their RAID management of storage elements 416. For example, RAID controllers 404 operable in a cache write-back mode may request the return of all dirty data along with associated redundancy information for posting (flushing) to storage elements 416. In response to such a request, cache controllers 406 and 408 determine which data in its cache is marked as dirty, further determines what other data may be related to the dirty data (i.e., other data associated with the same stripe), and further generates or retrieves associated redundancy information for return with the dirty data to the requesting RAID controller 404. Cache controllers 406 and 408 may, for example, read other related blocks of data from storage elements 416 and/or read old parity data from storage elements 416 in order to generate updated redundancy information. Central cache controllers 406 and 408 therefore retain all information necessary to associate cache blocks with particular stripes of the disk array. Furthermore, the cache meta-data identifies new data (dirty data yet unposted to the storage elements) versus old data (already posted to the storage elements 416).

As noted elsewhere herein, central cache controllers 406 and 408 also provide a centralized control point for semaphore allocation, lock, and release to coordinate stripe locking. Stripe locking, as taught in co-pending U.S. patent application Ser. No. 08/772,614, enables a plurality of controllers (e.g., 404) to share and coordinate access to commonly attached storage elements (e.g., shared access to one or more RAID LUNs). These centralized features provided by the central cache controllers 406 and 408 frees resources of the controllers 404 to provide improved overall subsystem throughput. Specifically, the features and services provided by central cache controllers 406 and 408 free computational processing power within controllers 404 and frees communication bandwidth on FC-AL 412 and 414. The freed processing power and communication bandwidth is then available for improved processing of host generated I/O requests.

Further, as noted above, cache controllers 406 and 408 may operate in a mirrored operation mode. Cache mirroring operations and communications are also off-loaded from controllers 404. Rather, cache controllers 406 and 408 communicate directly with one another via a dedicated communication path 418. Still further as noted above, in the preferred embodiment of FIG. 4, caching controllers 406 and 408 preferably provide centralized cache statistical information such as write over-writes or cache hit rate to controllers 404 (or to a host system not shown). Controllers 404 can use this centralized cache statistical information to tune the performance of the data storage subsystem 402 in view of subsystem wide cache efficiency.

CENTRALIZED CACHE API

As noted above, the centralized cache of the present invention presents its features to the commonly attached controllers via an API. These API features are then accessed by the controllers using well known inter-process communication techniques applied to a shared communication path. As noted above with respect to FIGS. 2 and 4, the shared communication path may utilize any of several communication media and topologies.

The API functions use essentially two data structures for passing of parameters. A BLOCKLIST is a variable length list of entries each of which describes a particular range of logical blocks in a logical unit (LUN) which are relevant to the central cache operation requested. A STRIPELIST is a variable length list of entries each of which describes a particular range of RAID stripes in a LUN which are relevant to the central cache operation requested.

Each BLOCKLIST entry contains substantially the following fields:

| | |
|---|---|
| long LUN | // the logical unit identifier for the desired blocks |
| long st_block | // logical block number of the first block of interest |
| long n_block | // number of contiguous blocks of interest |
| parm_t params | // attributes and parameters of the identified blocks |

Each STRIPELIST entry contains substantially the following fields:

| | |
|---|---|
| long LUN | // the logical unit identifier for the desired stripes |
| long st_stripe | // logical stripe number of the first stripe of interest |
| long n_stripe | // number of contiguous stripes of interest |
| parm_t params | // clean/dirty, new/old, etc. attributes of data |

Where the API function exchanges data along with the BLOCKLIST or STRIPELIST parameters, the associated block data is transferred over the communication medium following the API request. For example, blocks to be added to the cache are preceded by an appropriate API request to the central cache then the actual information in those blocks is transferred to the central cache. In like manner, data requested from the central cache is returned from the central cache to the requesting controller following execution of the API function within the central cache. Communication protocols and media appropriate to control such multi-point communications are well known in the art. In addition, those skilled in the art will readily recognize a variety of error conditions and appropriate recovery techniques therefor. Error status indications are exchanged between the central cache and the controllers as appropriate for the particular API function. Exemplary API functions include:

cache_insert(BLOCKLIST blist) // inserts blocks in blist to central cache

The specified list of blocks are inserted in the central cache with the parameters and attributes as specified in each clocks BLOCKLIST entry. As noted, the actual data to be inserted in the specified blocks of the central cache are transferred following the transfer of the API request. The specified parameters and attributes include:

NEW/OLD
The associated block is either a NEW block in a stripe or an OLD block.
DATA/PARITY
The associated block is either a DATA portion of a stripe or a PARITY portion of a stripe.
VALID/INVALID
A bitmap parameter value having a bit for each sector in the associated block. Each sector may be VALID (e.g., contains useful data) or INVALID.
CLEAN/DIRTY
A bitmap parameter value having a bit for each sector in the associated block. Each sector may be DIRTY (e.g., contains data not yet posted to the disk array) or CLEAN.

cache_modify(BLOCKLIST blist) // modifies attributes of blocks in blist

The attributes of the specified list of blocks are altered in accordance with the parameters of the block list entries.

cache_delete(BLOCKLIST blist) // deletes blocks in blist from central cache

The specified list of blocks are removed from the central cache contents.

cache_read(BLOCKLIST blist) // returns information from the specified blocks

The information in the specified list of blocks is retrieved from the central cache memory and returned to the requesting controllers.

cache_xor(BLOCKLIST blist1,
  BLOCKLIST blist2, . . .
  BLOCKLIST blistN,
  BLOCKLIST blistdest) // returns the XOR of the specified blocks The central cache retrieves the specified blocks in central cache and computes the XOR parity of those blocks for return to the requesting controller in the supplied destination block list. In particular, a variable number of "source" block lists may be supplied to this API function. The first block in the first block list parameter is XOR'd with the first block of the second block list parameter, and the third, fourth, etc. Then the second block in the first block list parameter is XOR'd with the second block in the second block list , and the third, fourth, etc. until all specified blocks are XOR'd together. The last block list parameter identifies a list in which the XOR results of the specified blocks are returned. As noted above, this function may be centralized in the central cache to further simplify the structure of the control modules. The control modules need not include special parity assist circuits. Rather, the central cache can provide the requisite functions to all control modules.

cache_stripe_map(STRIPELIST slist) // returns info about the specified stripes

The central cache maintains centralized knowledge regarding the parameters of each block in a stripe. When a controller determines that it must flush the cache contents of "dirty" data, it may invoke this function to retrieve a map of the status (attributes) of each block in each of the specified stripes. The map information regarding the requested stripes is returned to the requesting controller.

cache_flush(STRIPELIST slist) // performs a flush of the requested stripes

As above, the controllers may perform flushes by requesting a stripe map then requesting a read of the specific blocks to be flushed. In the alternative, the controllers may request that the central cache perform a flush on their behalf. The central cache has centralized information regarding the attributes of each block in the cache. In addition, the central cache may have a communication path to the disk array devices as do the controllers. Where such access to the disk drives is provided to the central cache modules, the central cache may locally perform the requested flush operations directly without further intervention by the controllers. In response to this API function, the central cache flushes all blocks in the requested stripes which are dirty then alters the attributes of those blocks as required to indicate their new status.

cache_stripe_lock_req(STRIPELIST slist) // locks the requested stripes

As noted above, the cooperating controllers which share access to common disk drives must coordinate their concurrent access via semaphore locking procedures. The central cache may provide such semaphore lock procedures for use by the cooperating controllers. The requested stripes, if not presently locked, are locked and appropriate status returned to the requesting controller. If some of the requested stripes are presently locked, a failure status may be returned to the requesting controller. In the alternative, the central controller may queue such requests and coordinate the allocation of locked stripes among the various controllers.

cache_stripe_lock_release(STRIPELIST slist) // unlocks the specified stripes

The converse of the lock request API function. Releases the previously locked stripes and returns control to the requesting controller.

EXEMPLARY CENTRALIZED CACHE METHODS

Figure 5:
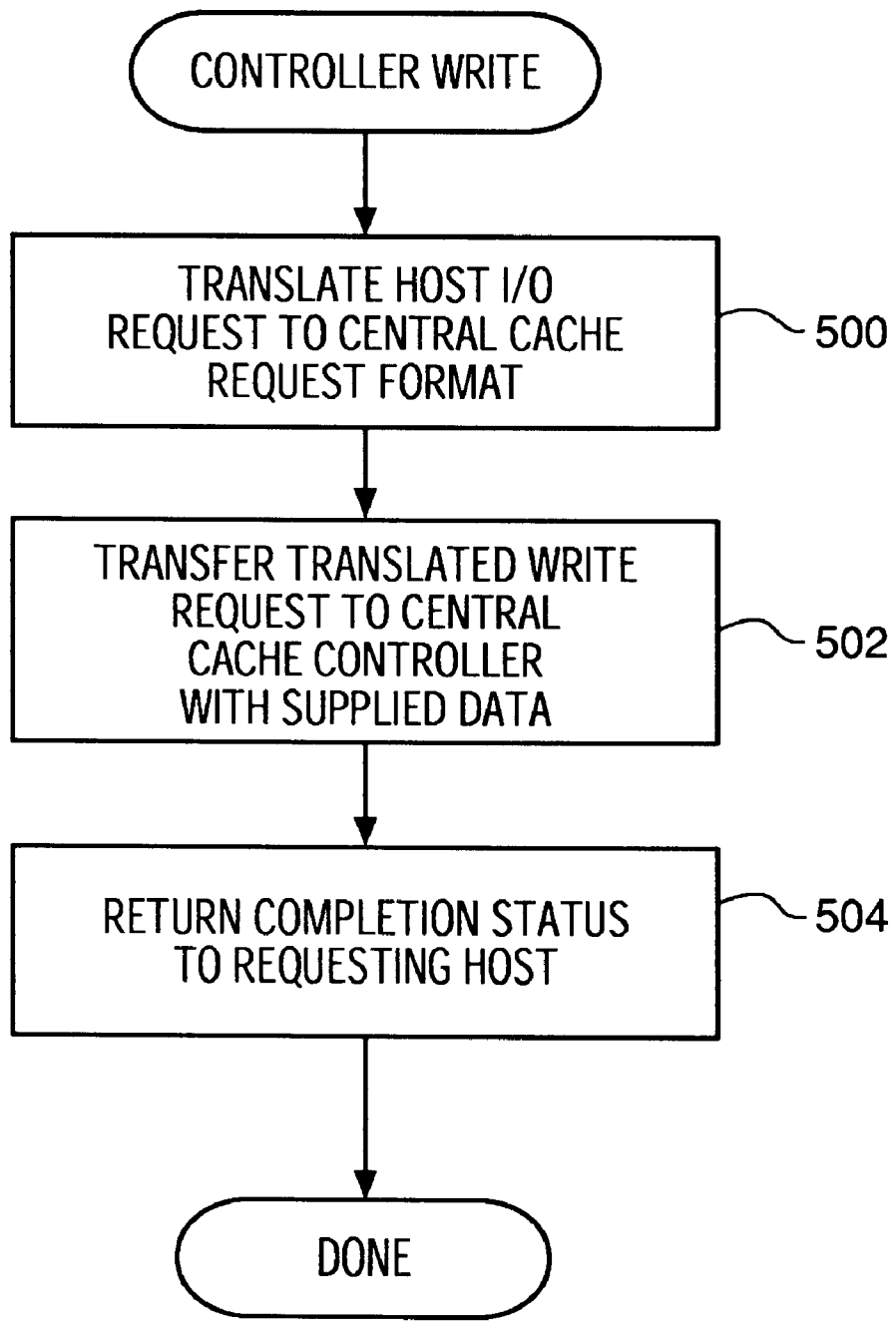
FIG. 5 is a flowchart illustrating the operation of the data storage controllers of the preferred embodiment in performing a host requested write operation.
Figure 6:
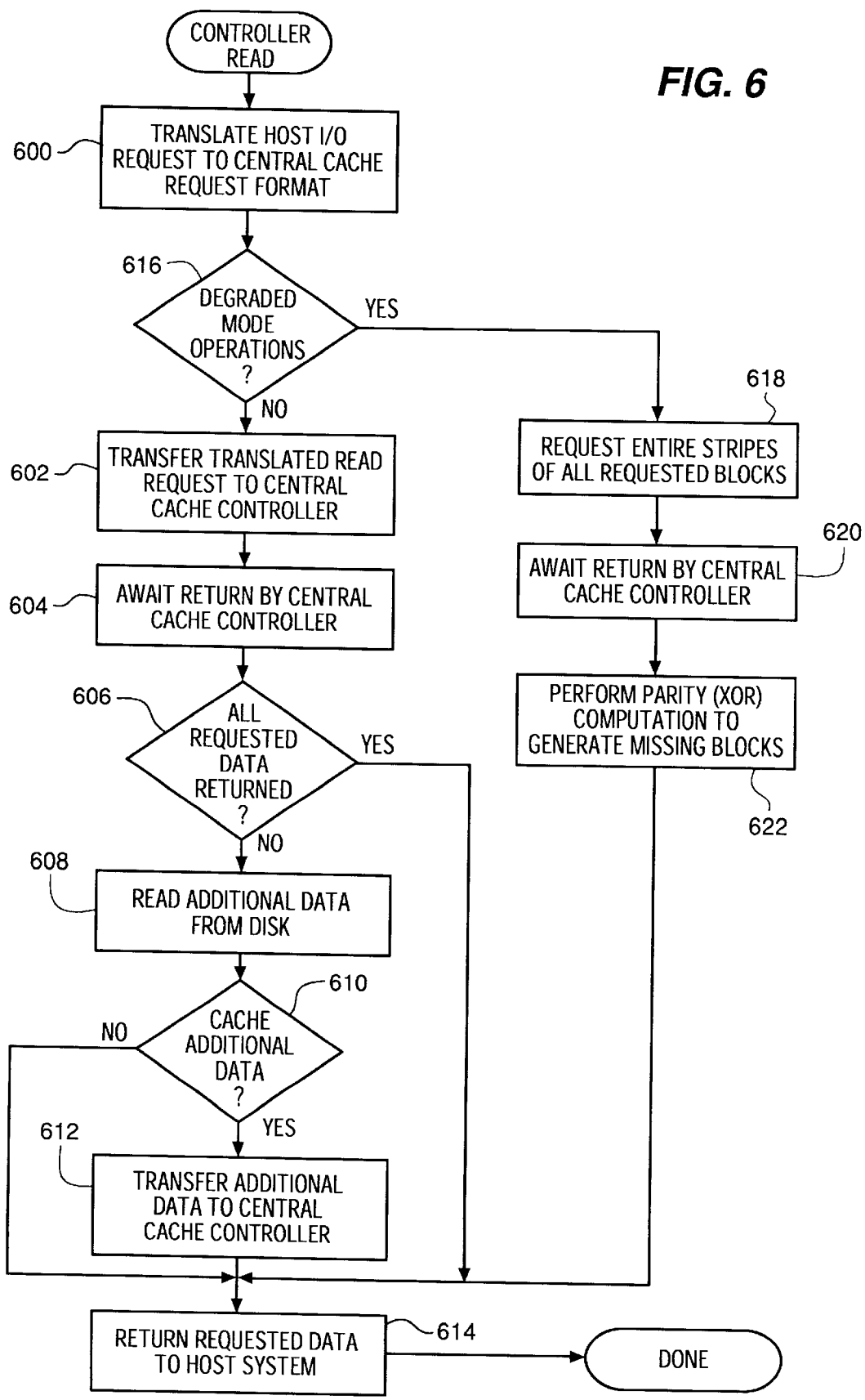
FIG. 6 is a flowchart illustrating the operation of the data storage controllers of the preferred embodiment in performing a host requested read operation.
Figure 7:
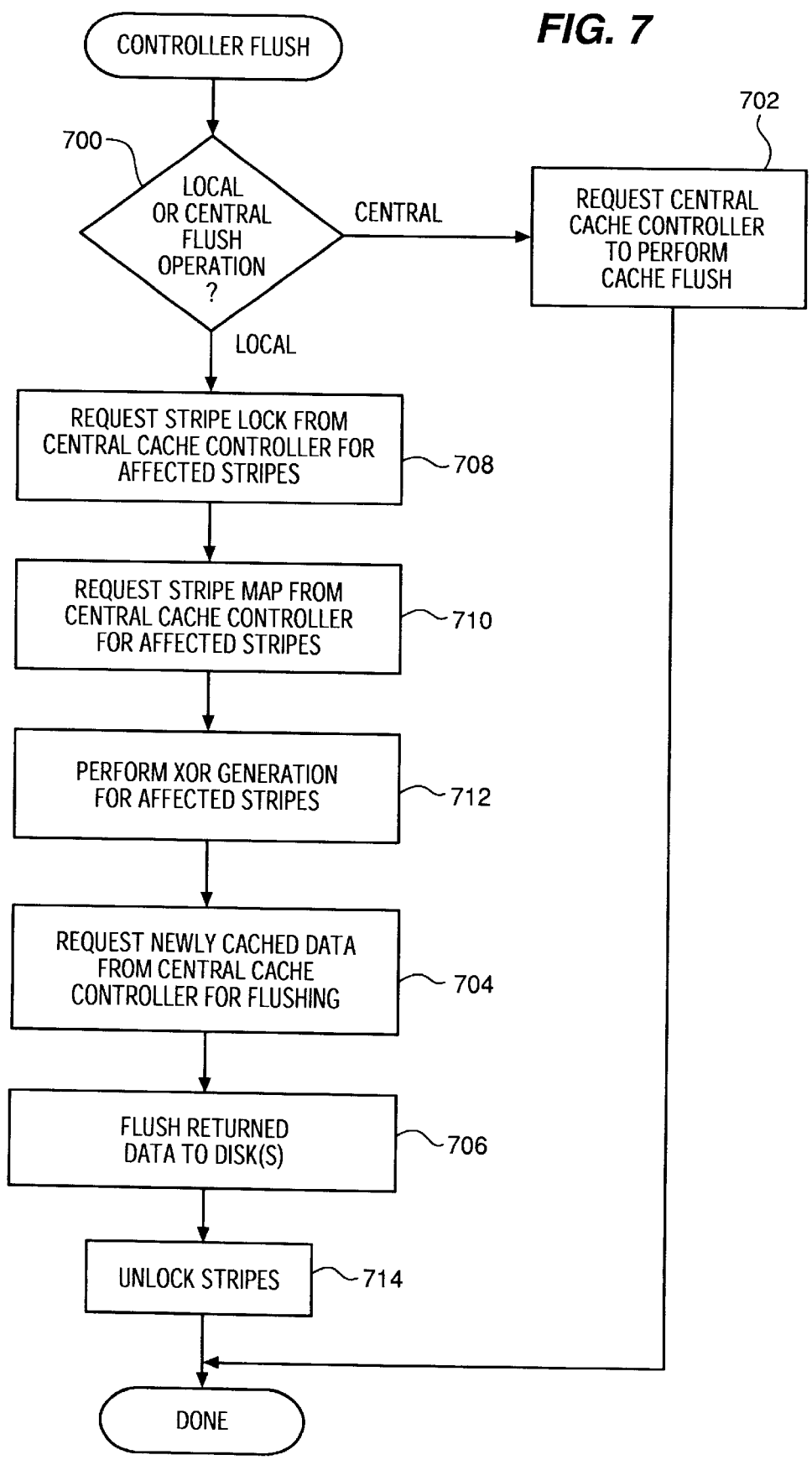
FIG. 7 is a flowchart illustrating the operation of the data storage controllers of the preferred embodiment in performing a cache flush operation.

FIGS. 5–11 are flowcharts describing the methods of the present invention operable in controllers (e.g., 404 of FIG. 4 and 204 of FIG. 2) in cooperation with cache controllers (e.g., 406 and 408 of FIG. 4 and 206 of FIG. 2) utilizing the above API functions. In particular, FIGS. 5–7 describe methods operable in storage controllers in accordance with the present invention to perform host initiated write and read requests and to initiate a cache flush operation. FIGS. 8–11 are flowcharts describing cooperative methods operable within the caching controllers to perform read and write requests as well as cache flush operations. The flowcharts of FIGS. 5–7 are intended as examples of the application of the API functions of the present invention. They are not intended to be exhaustive in demonstrating the use of every API function or every combination of API functions.

FIG. 5 illustrates the operation of controllers (e.g., 404 of FIG. 4) in processing host generated I/O write requests in accordance with the present invention. Element 500 is first operable to translate the received write request into appropriately formatted central cache operations required. The request to the central cache passes the host supplied data to the central cache controller along with block addressing information as discussed above. The particular cache addressing structure employed (as noted above) determines the precise processing performed by operation of element 500.

Element 502 is next operable to transfer the translated cache request to the central cache controller (e.g., 406 and 408) via the controller communication medium (e.g., 412 and 414). Once successfully transferred to the cache controller, element 504 is operable so that the controller may indicate completion of the I/O request to the host computer and thereby complete processing of the received I/O request from the perspective of the attached host computer. In particular, the controller invokes the cache_insert API function to request the new data be inserted in the central cache. The BLOCKLIST provided includes the NEW attribute for all blocks so added to the cache.

The host computer may then continue with other processing and generation of other I/O requests. Subsequent operation of the controller, discussed below, may. determine that the newly posted data in the central cache needs to be flushed to the disk array.

FIG. 6 is a flowchart describing the operation of controllers (e.g., 404 of FIG. 4) in processing host generated I/O read requests in accordance with the present invention. Element 600 is first operable to translate the received read request into appropriately formatted central cache operations required. The request to the central cache passes the block addressing information as discussed above for the data requested by the host read request.

Element 616 is then operable to determine if the storage subsystem is operating in a RAID degraded mode due to failure of a drive in the specified LUN. If not, processing continues with element 602 as discussed below. If the subsystem is operating in a degraded mode, element 618 is next operable to translate the host request into appropriate requests for the entire stripe(s) associated with the requested blocks. In particular, the controller requests the stripes by use of the cache_read API function where the BLOCKLIST requests all blocks in the associated stripes. Element 620 then awaits return of the requested information by the central cache controller.

Element 622 then performs an XOR parity computation on the returned strip blocks to generate any missing data blocks due to the failed drive. The XOR parity computation may be performed locally by the controller or may be performed by invoking the cache_xor API function to generate the parity for a list of blocks in the affected stripe(s). As noted above, the latter approach may be preferred if the controllers are simplified to eliminate XOR parity assist circuits while the central cache controller retains this centralized capability on behalf of the control modules. Processing then completes with element 614 returning the requested data, retrieved from the central cache, to the requesting host system.

Those skilled in the art will recognize that XOR parity computation are associated with particular levels of RAID management. Other RAID management, e.g., level 1 mirroring, do not require parity computations but rather duplicate the newly posted data to a mirror disk. Element 622 therefore represents any such RAID processing to assure reliable, redundant data storage as defined for the selected RAID management technique.

If not in degraded mode, element 602 is next operable to transfer the translated cache request to the central cache controller (e.g., 406 and 408) via the controller communication medium (e.g., 412 and 414). In particular, the controller issues a cache_read API function to retrieve the requested blocks of data. Element 604 then awaits return of the requested data (or other status) from the central cache controller. Central cache controller may return one of three possible conditions. First, central cache controller may return the requested data in its entirety. Second, only a portion of the requested data may reside in cache memory of the central cache controller and therefore only that portion of the requested data may be returned. Third, none of the requested data may reside in cache memory and therefore none of the requested data may be returned. A status code indicative of one of these three conditions is returned from central cache controller to the requesting RAID controller.

Element 606 is then operable to determine from the returned status code which of the three possible conditions is actually returned. If all requested data resided in the central cache controller's cache memory, then all requested data was returned and processing continues with element 614 to return the data to the host system and to thereby complete processing of the I/O read request. If less than all data was returned from the central cache controller, element 608 is next operable to read the additional data from the storage elements. The additional data comprises any requested data not returned from the central cache controller.

Element 610 is next operable after reading the additional data from disk to determine whether the additional data should be transferred to the central cache. Well known storage management techniques may be applied to make the determination as to whether the additional data should be added to the central cache. If so, element 612 is operable in a manner similar to that of element 502 above to transfer the additional data read from the disk array to the central cache.

Specifically, the controller issues a cache_insert API request to insert the additional data blocks into the central cache memory. Lastly, element 614 is operable, as noted above, to return all requested data to the host system and to thereby complete processing of the host system generated I/O read request.

FIG. 7 is a flowchart describing the operation of a RAID controller in accordance with the present invention to flush new data (dirty data) from the central cache to the disk array. Well known storage management techniques may be applied to determine when the cache need be flushed. The methods of the present invention are rather directed to techniques to flush a centralized cache shared by a plurality of controllers. Each controller may therefore make independent determinations as to whether and when to flush new data from the central cache to the disk array. In addition, the methods and structure of the present invention allow for the intelligent central cache controller(s) to determine independently that the cache memory content should be flushed (posted) to disk. The flowchart of FIG. 7 therefore describes processing within any of the RAID controllers after a determination has been made that the cache data should be flushed to the disk array.

Element 700 is first operable to determine whether the cache flush operation should be performed by the RAID controller itself or should be requested of the central cache controllers. This determination may be made based upon present loading of the requesting RAID controller as compared to the central cache controller. If the determination is made that the central cache controller should perform the cache flush, element 702 is operable to the generate and transfer a request to central cache controller requesting that it flush all new data for a given stripe list from its cache memory to the disk array. If the local RAID controller is to perform the flush operation, element 708 is next operable to request a stripe lock from the central cache controller for all stripes affected by the flush request. As noted, other well known methods are applied to determine which stripes are to be flushed at a particular time. Whichever stripes are to be flushed must be locked to prevent interference from other operations in the shared central cache controllers. Specifically, the controller issues a cache_stripe_lock_req API request for the affected stripes. As noted above, the central cache controller returns if the lock is granted. If the requested lock cannot be immediately granted, the central cache controller may queue the request and grant it at a later time. In the alternative, the central cache controller may return a failure status (not shown) and allow the controller to determine a strategy for handling the failure.

Once the requested stripe lock is successfully granted, element 710 is operable to request a stripe map from the central cache controller to identify which blocks in the affected stripes are still marked as "dirty." Only the central cache retains centralized knowledge of the present state of each block in cache. Other controllers may have previously requested a flush of the affected stripes and therefore blocks through to be "dirty" by this requesting controller may have been previously posted to the disk array. Specifically, the controller issues a cache_stripe_map API request to obtain this map information. Next, element 712 performs an XOR parity computation to generate updated parity blocks for the affected stripes. As above, this parity computation may be performed locally on the requesting controller or centrally in the central cache controller via a cache_xor API function.

Element 704 is next operable to request and retrieve all new (dirty) data from the central cache controller as indicated by the stripe map previously retrieved. In particular, element 704 issues cache_read API requests for the data blocks having dirty data to be posted. Element 706 is then operable to perform the required disk operations to flush the retrieved new data from the central cache to the disk array. Further, element 706 issues an appropriate API request to alter the attributes for the posted blocks. In the preferred embodiment, a cache_modify API request is issued to alter parameters for an identified list of blocks. The blocks just posted to disk by the flush operation would be altered to a CLEAN attribute. Alternatively, a cache_delete API request may be issued to remove the flushed blocks from the cache. Element 714 then unlocks the affected stripes.

FIGS. 8–11 describe methods of the present invention operable within central cache controllers 406 and 408 in response to API requests generated by RAID controller 404 as noted above.

Figure 8:
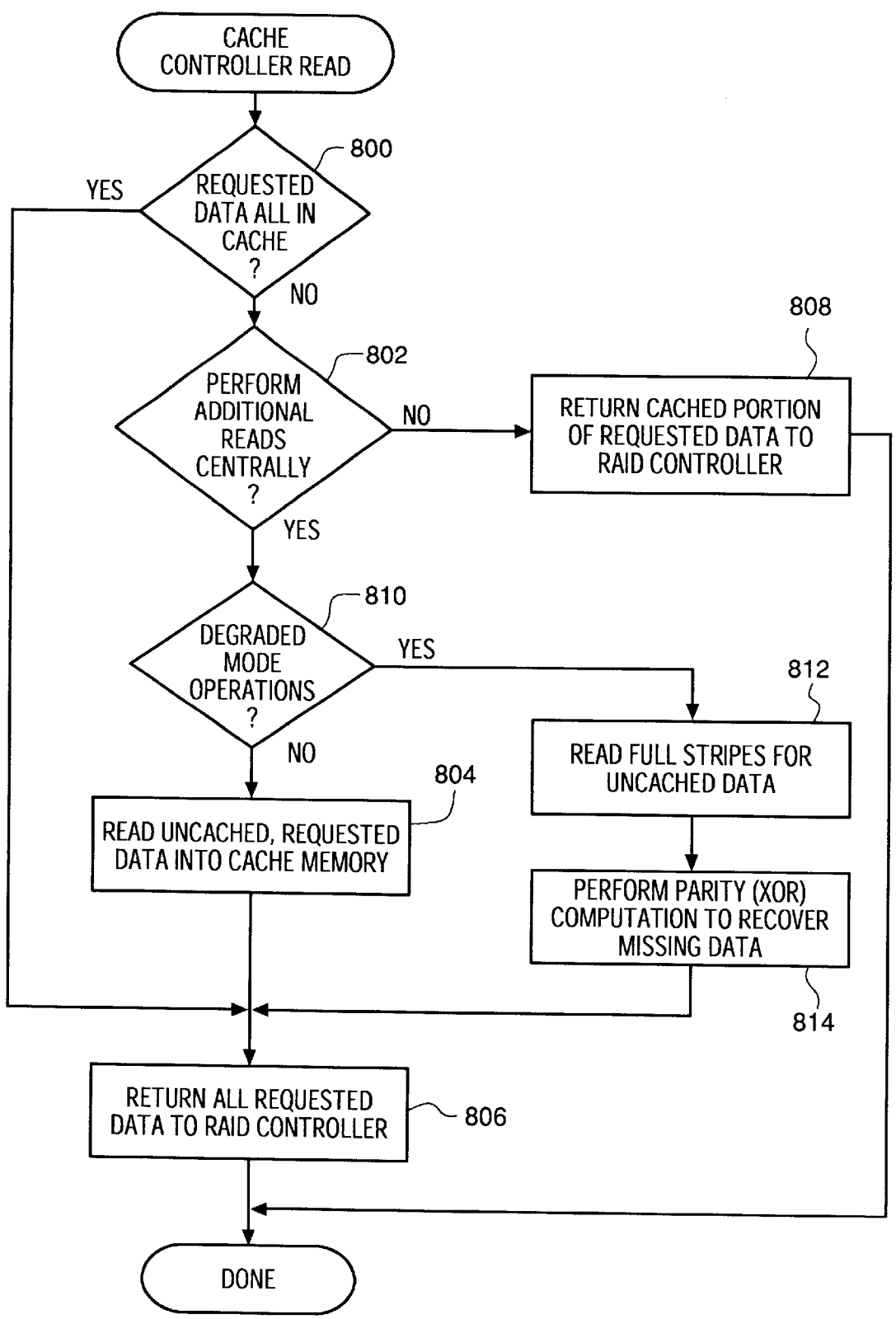
FIG. 8 is a flowchart illustrating the operation of the caching controllers in conjunction, with the data storage controllers of the preferred embodiment to perform a cache read operation.

FIG. 8 describes the operation of the central cache controller in response to a cache_read API request generated by one of the RAID controllers. As noted above, such a request may result in all requested data being found in the cache memory and returned, a portion of the requested data being found in the cache memory and returned, or none of the requested data being found in the cache memory. Element 800 first determines whether all requested data presently resides in the cache memory. If so, element 806 is next operable to return all requested data from the cache memory to the requesting RAID controller to thereby complete the read cache data request.

If less than all the requested data is found in cache memory, element 802 is operable to determine whether disk read operations to retrieve the additional data should be issued locally within the central cache controller or left to the option of the requesting RAID controller. If the additional data will be retrieved from disk by the RAID controller, element 808 is next operable to return that portion of the requested data which was found in the cache memory to thereby complete the read cache data request.

Element 810 is next operable if the additional data is to be read from the disk drive locally within the central cache controller. Element 810 determines whether the subsystem is operating in a degraded mode due to failure of a disk in the requested LUN. If not in degraded mode, processing continues with element 804 discussed below. If operating in degraded mode, element 812 is operable to retrieve from the cache the entire stripe associated with each requested block. Element 814 then performs a local parity computation using the parity assist features of the central cache controller to recover any data missing due to the disk failure. Processing then continues with element 806 below.

Element 804 reads any additional data required to satisfy the requested read cache data request. Well known cache management techniques may operate within central cache controller to determine what data, in addition to the requested data, may also be read. For example, other data physically near the requested data (such as the remainder of a track or cylinder) may be read in anticipation of future use. Or, for example, associated parity data may be read from the disk array in anticipation of its use in the near future.

Element 806 is then operable in response to reading the additional data to return all data requested by the read cache data request to the requesting RAID controller to thereby complete the request.

Figure 9:
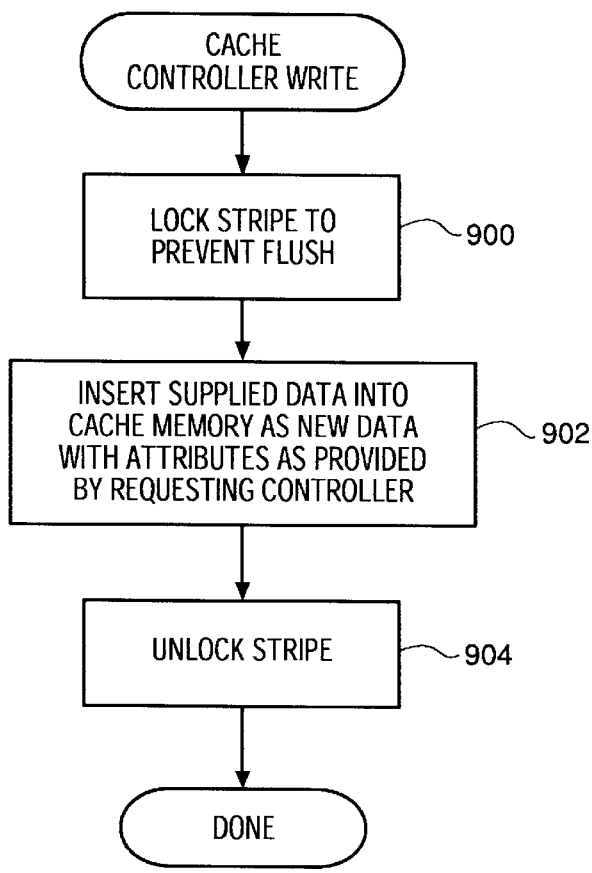
FIG. 9 is a flowchart illustrating the operation of the caching controllers in conjunction with the data storage controllers of the preferred embodiment to perform a cache insert operation.

FIG. 9 describes the operation of the central cache controllers 406 and 408 in response to a cache_insert API request from a RAID controller. Element 900 is first operable to lock the stripe(s) associated with the blocks to be inserted. Since the central cache controls the semaphore locking, it performs the lock locally without intervention by or notice to attached controllers. The lock prevents other controllers from accessing the affected blocks until the insert operation is completed. For example, the lock prevents another controller from requesting a cache insert or flush operation. Element 902 then inserts the supplied blocks into the cache memory of the central cache controller in accordance with its specified block numbers and with attributes as indicated by the parameters of the BLOCKLIST entries. Where the blocks contain new data, the new data overwrites any previous data in the cache whether clean or dirty, etc. Lastly, element 904 unlocks the locked stripes to permit other operations.

Figure 10:
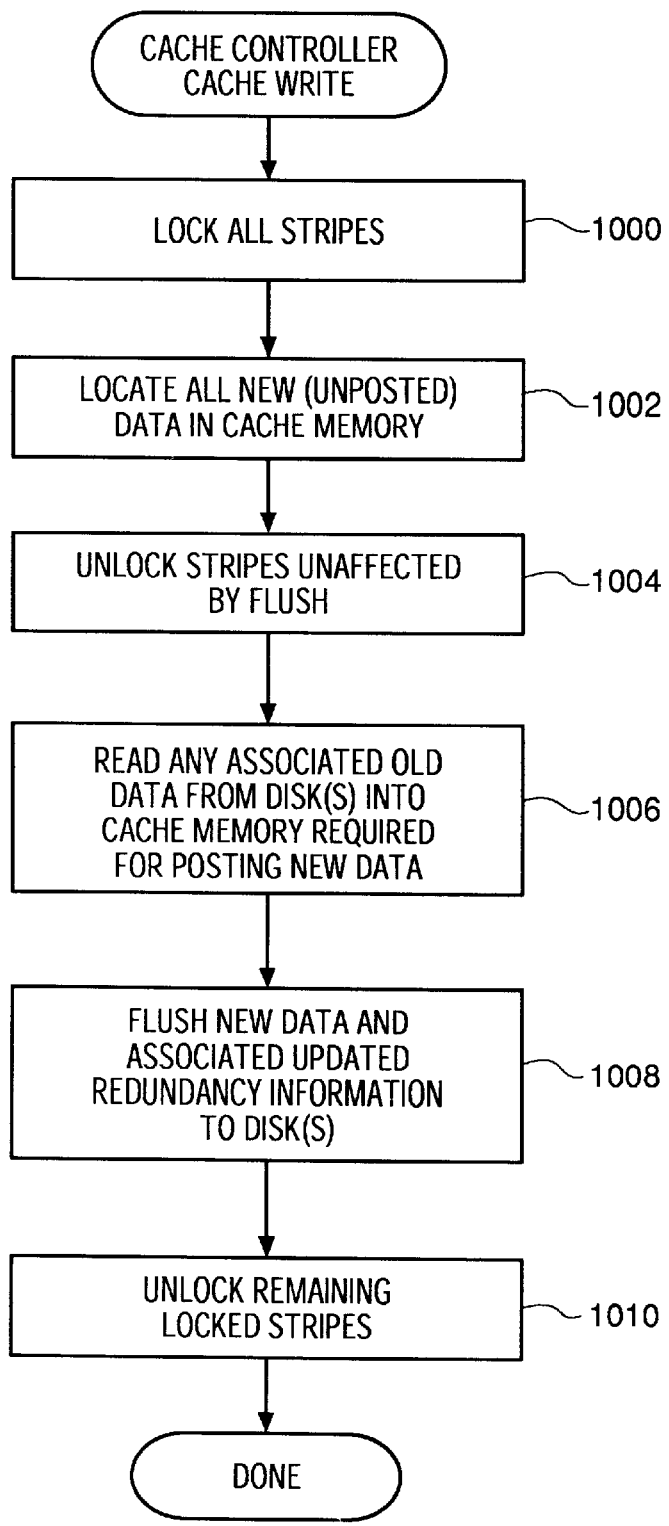
FIG. 10 is a flowchart illustrating the operation of the caching controllers in conjunction with the data storage controllers of the preferred embodiment to perform a cache flush operation.

FIG. 10 describes the operation of the central cache controller in response to a cache_flush API request from an attached controller. As noted above, the present invention permits the controllers to perform flushes locally such that each controller performs its own flush operation by use of cache_stripe_map and cache_read API function requests. The central cache controller responds to such requests to supply the data requested by the controller with centralized knowledge of the present status of each block in the central cache memory.

In the alternative, the controllers may request that the central cache controller perform the cache flush operation on behalf of the controller. In this case as shown in FIG. 10, the controller issues a cache_flush API request with a STRIPELIST indicating the stripes that the controller has determined should be flushed. The central cache controller performs the cache flush for the requested stripes but with centralized knowledge as to the present status of each block in the requested stripes. In particular, some of the requested stripes may have been previously flushed by operations requested from other controllers. The central cache controller therefore performs the requested flush in accordance with the present status of each block in the requested stripes.

In addition to such controller directed flush operations, the central cache controller may include background processing which periodically flushes data from the central cache memory to the disk array in response to loading analysis within the central cache controllers. Such background processing which determines what data to flush at what time may simply invoke the processing depicted in FIG. 10 to perform the desired flush operations.

Element 1000 is first operable to lock all stripes in the STRIPELIST of the cache_flush API request. Element 1002 then locates all new (unposted or dirty) data in the cache memory of the central cache controller for the requested stripes. As noted, above, the central controller is the central repository for present status information regarding all blocks in the central cache. It is therefore possible that the controller has requested the flushing of one or more stripes which no longer contain "dirty" data. Element 1004 is therefore operable to unlock any stripes among the requested, locked stripes which no longer contain any dirty data to be flushed.

Element 1006 then reads any additional data required for posting of the located data. For example, current data corresponding to other data blocks in a stripe and/or the redundancy information (parity) for a stripe may be required in order to update the parity (redundancy information) for stripes about to be flushed. Or for example, element 1006 may determine that other data, unrelated to the particular stripe to be flushed, could be optimally read at this time in anticipation of future access (e.g., a read-ahead determination made by the controller or by the central cache controller). Element 1008 is operable to perform any required disk operation required to flush the located dirty data and associated parity updates to the disk array. Element 1008 is further operable to update the status of all blocks flushed by the disk operations performed. Those blocks which were marked as "dirty" blocks are now marked as "clean", no longer in need of flushing. Lastly, element 1010 unlocks the stripes which are now successfully flushed by operation of element 1008.

Those skilled in the art will recognize that the cache flush method of FIG. 10 may be invoked by request of a RAID controller as noted above or may be invoked by local RAID management intelligence of the central cache controller. In other words, in accordance with the present invention, a decision to flush the contents of the central cache may be made by one of the plurality of RAID controllers or by the intelligent central cache controller(s) themselves. Also, as noted here, the operations required to flush the cache content may be performed within the central cache controller or by one of the RAID controllers by retrieval of new data from the central cache.

Figure 11:
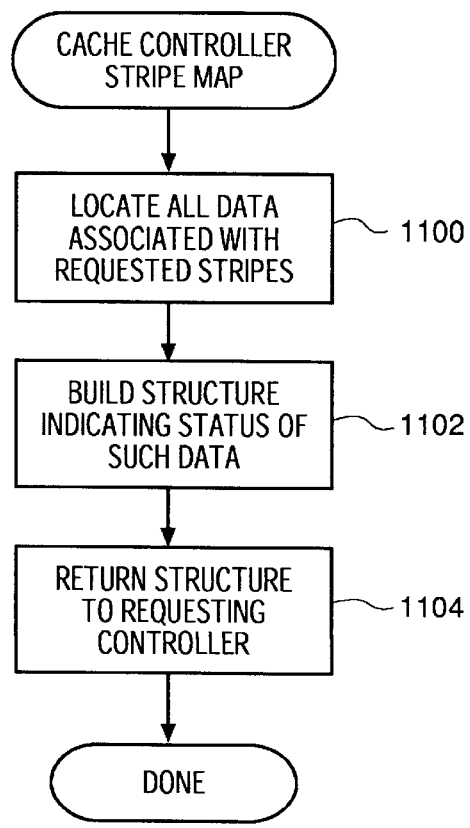
FIG. 11 is a flowchart illustrating the operation of the caching controllers in conjunction with the data storage controllers of the preferred embodiment to perform an operation to retrieve a map of status information regarding stripes for flushing by a data storage controller.

FIG. 11 describes the operation of the central cache controller in response to cache_stripe_map API requests from a RAID controller. As noted above, controllers may perform their own flush operations by requesting dirty data from the central cache for stripes to be flushed. The controllers request information from the central cache controller for stripes believed to contain dirty data. The information consists of a map of each stripe of interest which describes the status of each block in the identified stripes.

Element 1100 first locates the requested status information regarding blocks in the stripes identified by the controllers STRIPELIST parameter. Element 1102 then builds the map information into data structure for return to the requesting controller. Element 1104 then returns the data to the requesting controller.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a data storage subsystem having a plurality of data storage elements, an apparatus comprising:

a plurality of storage controllers which receive and process I/O requests generated by a host computer;

an intelligent central cache dedicated to use by the data storage subsystem, said central cache being cooperatively engaged with said plurality of storage controllers to provide management of said plurality of data storage elements, wherein said intelligent central cache contains more cache memory than any of said plurality of storage controllers and wherein said intelligent central cache does not receive or process I/O requests generated by said host computer; and a controller communication medium operable for exchange of information among said plurality of storage controllers and said intelligent central cache and said data storage elements, wherein said intelligent central cache and said plurality of storage controllers exchange cache control information to coordinate cache management among said plurality of storage controllers and wherein said intelligent central cache includes a general purpose processor to process said exchange of said cache control information within said intelligent central cache.

2. The apparatus of claim 1 wherein said intelligent central cache is further operable to provide cache statistical information.

3. The apparatus of claim 1 wherein requests directed to said intelligent central cache are addressed in correspondence with physical placement of data within said intelligent central cache.

4. The apparatus of claim 1 wherein requests directed to said intelligent central cache are addressed in correspondence with logical block address of said data storage elements.

5. The apparatus of claim 1 further comprising:
at least one additional intelligent central cache, wherein said controller communication medium being further operable for exchange of information among said at least one additional intelligent central cache and said plurality of storage controllers and said intelligent central cache and said data storage elements.

6. The apparatus of claim 5 wherein said at least one additional intelligent central cache is operable to mirror data in said intelligent central cache.

7. The apparatus of claim 1 wherein said controller communication medium includes:
a serial communication medium.

8. The apparatus of claim 7 wherein said serial communication medium includes:
a Fibre Channel Arbitrated Loop.

9. The apparatus of claim 7 wherein said serial communication medium includes:
a plurality of redundant Fibre Channel Arbitrated Loops.

10. The apparatus of claim 1 wherein said plurality of storage controllers provide RAID management of said plurality of data storage elements.

11. The apparatus of claim 10 wherein said intelligent central cache provides RAID management of said plurality of data storage elements in cooperation with said storage controllers.

12. In a storage subsystem having a plurality of storage controllers, an intelligent central cache comprising:
a central cache memory; and
an intelligent cache controller coupled to said central cache memory and coupled to said plurality of storage controllers wherein said plurality of storage controllers receive and process I/O requests generated by a host computer, wherein said intelligent cache controller does not receive I/O requests from said host computer, wherein said central cache memory is larger than any cache memory in any of said plurality of storage controllers, wherein said intelligent cache controller is adapted to process cache requests received from said plurality of storage controllers, wherein said intelligent cache controller includes a general purpose processor to process said cache requests and wherein said cache requests include:
requests to insert data into said central cache memory in accordance with cache meta-data associated with said data supplied by a requesting one of said plurality of storage controllers,
requests to delete previously inserted data from said central cache memory, and
requests to retrieve previously inserted data from said cache memory.

13. The intelligent cache controller of claim 12 wherein said cache meta-data includes:
indicia of a clean status associated with said data, and
indicia of a dirty status associated with said data.

14. The intelligent cache controller of claim 13 wherein said cache requests further include:
request to return information identifying particular portions of said data previously inserted in said central cache memory having a dirty status associated therewith.

15. The intelligent cache controller of claim 13 wherein said cache requests further include:
requests to flush to disk drives associated with said storage subsystem particular portions of said data previously inserted in said central cache memory having a dirty status associated therewith.

16. The intelligent cache controller of claim 12 wherein said cache meta-data includes:
indicia of a new status associated with said data, and
indicia of a old status associated with said data.

17. The intelligent cache controller of claim 12 wherein said cache meta-data includes:
indicia of a parity type associated with said data, and
indicia of a non-parity type associated with said data.

18. The intelligent cache controller of claim 12 wherein said cache requests further include:
requests to lock for exclusive access particular portions of said data previously inserted in said central cache memory, and
requests to unlock previously locked particular portions of said data previously inserted in said central cache memory.

19. The intelligent cache controller of claim 12 wherein said cache requests further include:
requests to compute the bitwise XOR of particular portions of said data previously inserted in said central cache memory.

20. A RAID data storage subsystem for storing data received from and providing stored data to a host computer, said storage subsystem comprising:
a disk array including a plurality of disk drives;
a plurality of storage controllers that receive and process I/O requests generated by said host computer;
a cache controller that includes a large central cache memory, wherein said cache controller controls said central cache memory on behalf of said storage controllers, wherein said cache controller does not receive I/O requests from said host computer, wherein said central cache memory is shared by said storage controllers, wherein said central cache memory is larger than any cache memory in any of said storage controllers, wherein said cache controller includes a general purpose processor for controlling the content of said large central cache memory and wherein said central cache memory stores user data that is transferred between said storage controllers and said disk array, wherein said cache controller provides logical to physical mapping for logical addresses from said host computer to physical addresses on said disk array, wherein said cache controller receives said logical addresses from said storage controllers, and wherein said storage controllers do not provide said logical to physical mapping; and
a communication medium that provides communication between said storage controllers, said cache controller and said disk array.

21. The storage subsystem of claim 20 wherein said storage controllers each include a small cache memory that buffers data in communication with said central cache memory.

22. The storage subsystem of claim 20 wherein said storage controllers are devoid of cache memory.

23. The storage subsystem of claim 20 wherein said cache controller includes a parity assist circuit that is shared by said storage controllers, and said storage controllers are devoid of a parity assist circuit.

24. The storage subsystem of claim 20 wherein said cache controller provides meta-data from user data stored in said central cache memory, and wherein said storage controllers do not provide said meta-data.

25. The storage subsystem of claim 20 wherein said cache controller provides mapping of RAID stripe geometries and distribution of data over said disk array, and said storage controllers do not provide said mapping.

26. The storage subsystem of claim 20 wherein said storage controllers communicate with one another by message traffic over said communication medium and said message traffic is devoid of cache coordination.

27. The storage subsystem of claim 20 wherein said storage controllers and said cache controller are substantially identical electronic assemblies except that said storage controllers are substantially void of cache memory and associated circuits.

28. The storage subsystem of claim 27 further including a redundant cache controller and a dedicated communications link, wherein said redundant cache controller includes a large redundant central cache memory, wherein said redundant cache controller maintains control over said redundant central cache memory, wherein said redundant central cache memory provides a mirror image of the contents of said central cache memory, wherein said communications media provides communication between said storage controllers, said cache controller, said redundant cache controller and said disk array, and wherein said dedicated communications link provides communication between said cache controller and said redundant cache controller and is isolated from said storage controllers and said disk array.

* * * * *